Figure 1:
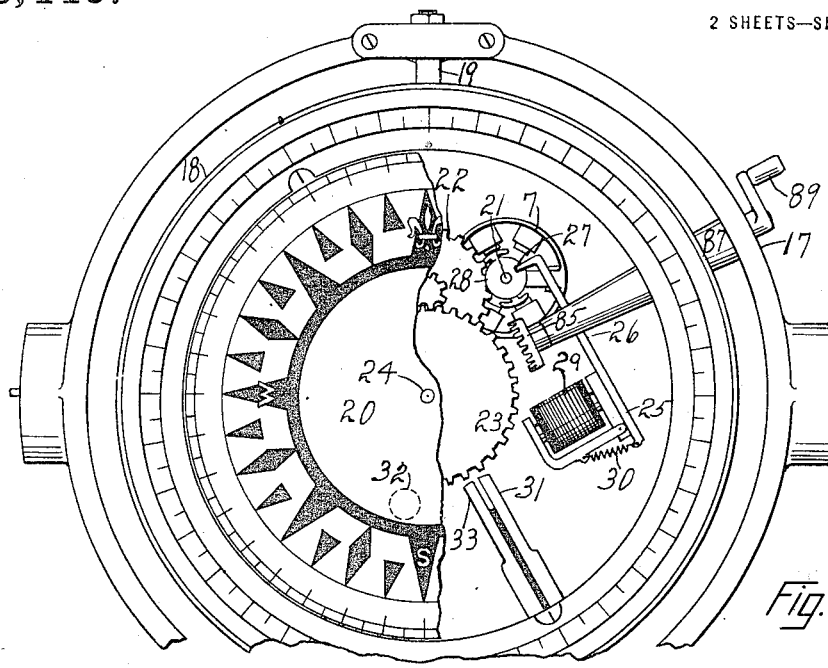

E. A. SPERRY.
REPEATER SYSTEM FOR GYRO-COMPASSES.
APPLICATION FILED AUG. 23, 1915.

1,296,440.

Patented Mar. 4, 1919.
2 SHEETS—SHEET 1.

INVENTOR.
ELMER A. SPERRY,
BY Herbert H. Thompson
ATTORNEY.

E. A. SPERRY.
REPEATER SYSTEM FOR GYRO-COMPASSES.
APPLICATION FILED AUG. 23, 1915.
1,296,440.
Patented Mar. 4, 1919.
2 SHEETS—SHEET 2.
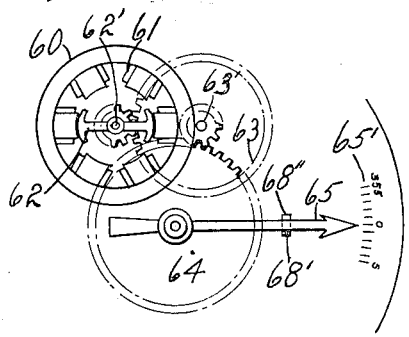
Fig. 6.
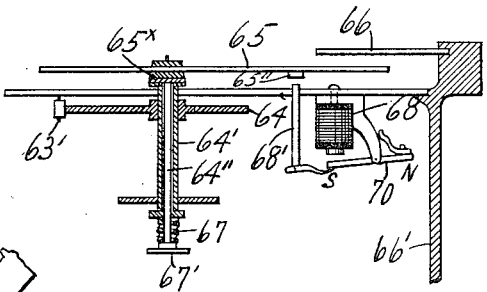
Fig. 8.
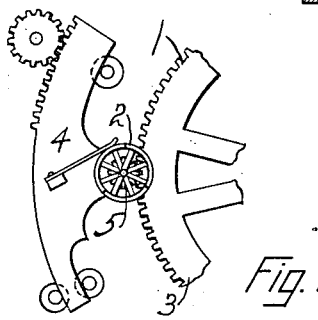
Fig. 7.
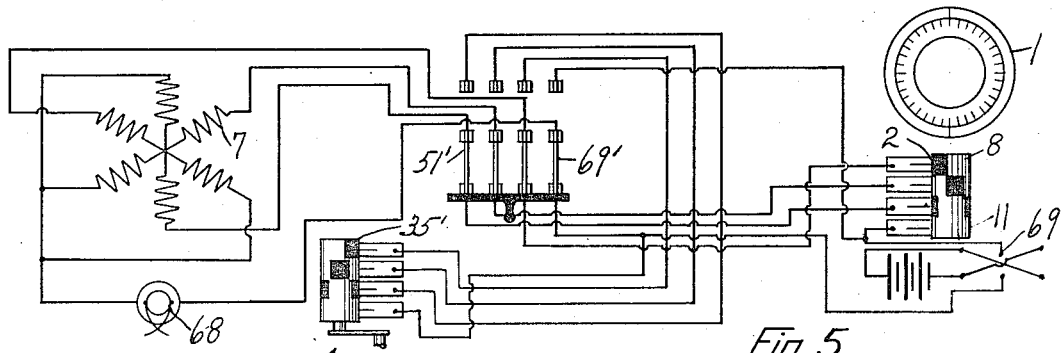
Fig. 5.
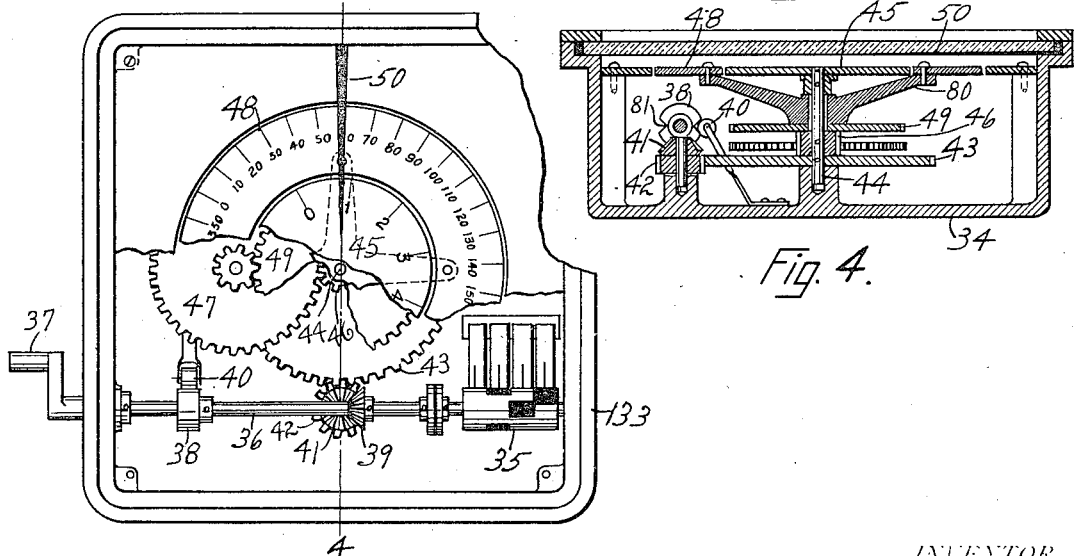
Fig. 4.
Fig. 3.
INVENTOR.
ELMER A. SPERRY,
BY Herbert H. Thompson
ATTORNEY.

UNITED STATES PATENT OFFICE.

ELMER A. SPERRY, OF BROOKLYN, NEW YORK, ASSIGNOR TO THE SPERRY GYROSCOPE COMPANY, OF BROOKLYN, NEW YORK, A CORPORATION OF NEW YORK.

REPEATER SYSTEM FOR GYRO-COMPASSES.

1,296,440.  Specification of Letters Patent.  Patented Mar. 4, 1919.

Continuation in part of application Serial No. 634,595, filed June 21, 1911. This application filed August 23, 1915. Serial No. 46,819.

*To all whom it may concern:*

Be it known that I, ELMER A. SPERRY, a citizen of the United States of America, residing at 100 Marlborough road, Brooklyn, N. Y., have invented certain new and useful Improvements in Repeater Systems for Gyro-Compasses, of which the following is a specification.

This invention relates to means for reproducing at a distance the readings of a master compass or other indicator. This application contains matter divided from applicant's copending application Ser. No. 634,595, gyroscopic navigation apparatus, filed June 21, 1911, patented Feb. 5, 1918, Patent No. 1,255,480, and hence is a continuation thereof.

For navigating the modern warship, including the submarine, one or more gyroscopic compasses are now employed, which are placed down in the hold of the ship out of the danger zone and near the center of the vessel, so as to be out of the path of the enemy's fire and free from disturbances due to the rolling of the ship. The readings of the master compass are then reproduced at several convenient points on the ship by means of indicators which I term repeater compasses or repeaters. The repeaters contain step-by-step motors which are electrically actuated from a transmitter on the master compass. This invention relates to a new and improved indicating system especially adapted for use as the repeating portion of a gyro-navigational unit. The invention has for one of its principal objects the production of a simple setting or synchronizing means whereby the repeaters may be brought into agreement with the master compass.

According to the repeating system I employ, both the transmitters and repeater motors are geared to rotate a number of times for each revolution of the indicator, so that, if the two instruments should fall out of step, some extraneous means must be used to bring the two into synchronism. The problem is further complicated by the fact that the master compass cannot be manipulated when running, in order to synchronize the repeaters and by the fact that a plurality of repeaters are normally operated from one master compass.

The main object of this invention is to devise a simple means of setting the repeater compasses without disturbing the master gyro. Another object is to improve on the general construction of repeating systems.

Figures 2, 9, 10:
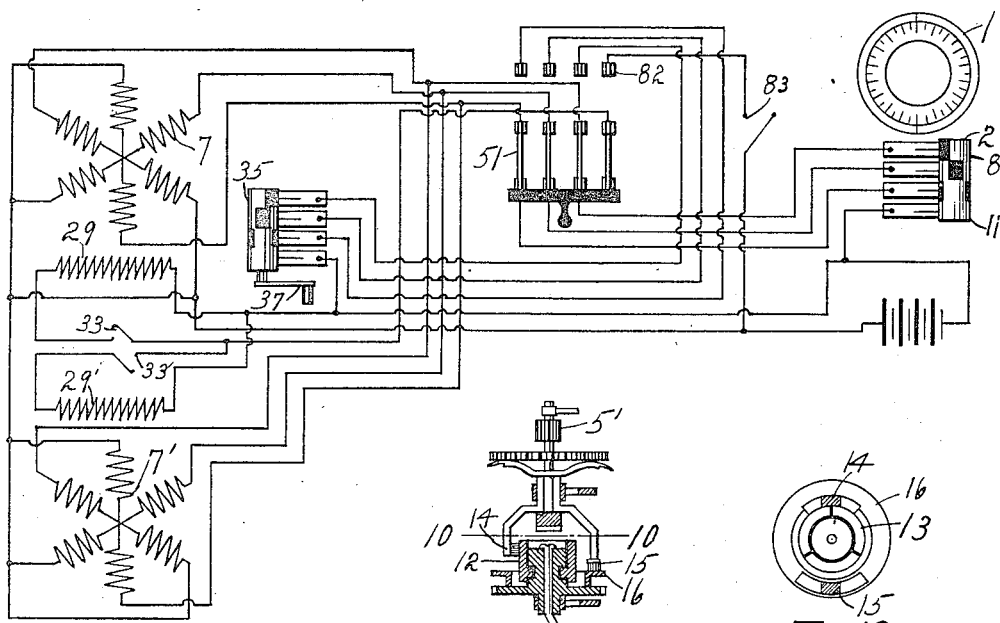
Figure 11:
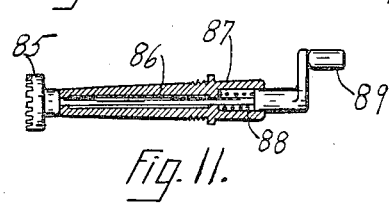

Referring to the drawings in which what I now consider to be the preferred forms of my invention are illustrated, Figure 1 is a plan view of a repeater compass partially broken away to show the operating mechanism. Fig. 2 is a wiring diagram of the complete repeating system showing one method of setting the indicators. Fig. 3 is a plan view of the setting instrument. Fig. 4 is a vertical section on line 4—4 of Fig. 3. Fig. 5 is a wiring diagram showing a modified setting or synchronizing system from that shown in Fig. 2. Fig. 6 is a diagrammatic plan view and Fig. 8 is a similar sectional view of an indicator designed according to this modification. Fig. 7 is a detail showing one method of mounting the transmitter on the master indicator or gyro-compass. Fig. 9 is a detailed section showing a modified form of transmitter. Fig. 10 is a section on line 10—10 of Fig. 9. Fig. 11 is a detailed section of the local setting means for the repeaters.

The master instrument or indicator is shown diagrammatically at 1 in Figs. 2 and 5, the transmitter mounted thereon being indicated at 2. One method of mounting the transmitter is shown in Fig. 7. A large gear 3 is secured to the indicator, and the transmitter 2 is rotatably mounted on a relatively stationary part 4, the details of which form no part of this invention, being embodied in my copending application above referred to. A pinion 5 on the shaft of the transmitter meshes with gear 3.

The type of transmitter I employ may assume several different forms. As shown in Fig. 7 and in the two wiring diagrams it comprises a rotary commutator provided with a plurality of sections, preferably one section greater than the number of pairs of poles in the repeater motors 7 used. The commutator is so designed that the repeater motor will have twice as many steps or positions per revolution as it has poles. This result is secured by laying out the commutator so that a circuit is completed simultaneously through two adjacent pairs of poles between the time that it is completed through each pair separately. For instance, in the illustration shown the repeater motor has six poles, so that with the ordinary design of transmitter it would have but six steps for each revolution, but with my improved design twelve steps are secured, there being an intermediate step between each pole. The commutator is provided with four sections, three of which are provided with two approximately 90° conducting segments 8 placed diametrically opposite. The conducting segments on the several sections are positioned 30° ahead of the segments on the adjacent section, so as to secure the result above indicated. The fourth section 11 provides a common return for all the sections.

The transmitter shown in Figs. 9 and 10 is of somewhat different form but secures the same result. In this form but a single longitudinal section 12 is provided on the commutator, which is divided into three radial segments 13. A single brush 14 bears on the commutator and its contacting portion is of sufficient area to bridge over the insulation between the sections 13 so that it may cover more than one section 13 at a time, as shown in Fig. 10. Another brush 15 bears on the conducting section 16 so as to furnish a common return for the sections. It will readily be seen with a properly designed brush 14 that this form of transmitter will secure the same results as secured by the transmitter shown in the wiring diagrams.

Turning now to the construction of the indicator, which is shown in the form of a repeater compass, reference numeral 17 denotes a gimbal ring support for the compass. The main casing is shown at 18 and is provided with trunnions 19 so as to be supported from the main gimbal ring 17. Within the casing is supported a repeater motor 7 such as shown in the wiring diagrams. The motor may be geared to the compass card 20 so as to rotate the same through any suitable form of gearing such as a pinion (not shown) on the motor shaft 21, reduction gears 22 and large gear 23 secured to the shaft 24 on which the card is mounted. An electro-magnetic lock 25 is provided for the card. Preferably this takes the form of a locking finger 26, the end of which is adapted to engage a notch 27 in a collar 28 on the motor shaft. An electro-magnet 29 serves to draw the latch into engagement with the notch when excited, a spring 30 serving to hold the latch normally retracted. In circuit with said magnet are a pair of contact fingers 31 mounted on a stationary part of the repeater compass and a button 32 mounted on a rotating part such as the underside of the compass card, the whole constituting a form of switch 33.

The synchronizer or setting transmitter 133 is shown in Figs. 3 and 4. The instrument is preferably located near the master compass, on the switch panel on which the various switches, etc., for controlling the compass are placed. It comprises a casing 34, within which the transmitter, proper, 35 is rotatably mounted. On the shaft 36 of said transmitter are mounted a handle 37, notched collar 38 and bevel gear 39. A spring-pressed roller 40 bears against said collar and is adapted to engage the notch or notches 81 so as to facilitate the bringing of the dials to a predetermined position.

Bevel gear 39 meshes with gear 41, on the shaft of which is mounted a pinion 42 meshing with a gear 43 on the shaft 44 of the dial 45. A pinion 46 is also mounted on said shaft and serves to drive reduction gears 47, which drive annular dial 48 through gear 49. A spider 80 is shown as secured to gear 49 for supporting the annulus. Both dials may be read on a single index 50. The notches 81 in collar 38 are so arranged as to engage the roller 40 when a graduation on either or both of the dials is under the index.

A complete synchronizing system for two repeater compasses is shown diagrammatically in Fig. 2. Normally, the double-throw switch 51 is in the position shown, so that the repeater motors 7 and 7' are in circuit with transmitter 2 on the master compass. In case it should become necessary to set any or all of the repeaters, the switch 51 is thrown over, thereby throwing setting transmitter 35 into the circuit. Preferably switch 51 serves also to close the circuit containing magnets 29, and 29' within the repeaters, as at 82, so that the lock will become effective. It should be observed, however, that the magnet will not be excited until switch 33 is also closed, that is until the card reaches a predetermined position, and also that the accuracy of the locked position is increased by locating the notch 27 on a part which makes a large number of revolutions per revolution of the compass card. To set any or all of the repeaters to agree with the master compass, the operator, after throwing switch 51, turns dial 48 through at least one complete revolution by turning handle 37, stopping the dial at 0. He may then be sure that all of the repeaters are also at zero or north, since switch 33 and notch 27 are positioned so as to lock the repeater in this position. Great accuracy is secured by positioning notch 27 in the same phase relation with respect to the motor armature as notch 81 is positioned with respect to transmitter 35, so that when the operator stops the dials 45 and 48 at zero and with roller 40 in notch 81, he may be sure that the transmitter and repeater motor 7 are in the same phase relation. If this relation were not established, the armature of repeater motor 7 would jump around, either forward or backward to the proper phase relation when finger 26 is withdrawn from notch 27, and thus destroy the accuracy of the instrument. After bringing the two instruments to zero and to the same phase relation, the operator opens the magnet circuit, as by a switch 83, which is normally closed, turns the dial 48 to the exact reading of the master compass and finally returns switches 51 and 83 to their normal positions.

An individual or local setting means may also be employed for each repeater. This preferably assumes the form of a crown gear 85 mounted on a shaft 86 which is held normally retracted within its containing sleeve 87 by a spring 88. By pushing in on handle 89, the crown gear may be brought into contact with gear 23 or the like, so that the repeater may be set by turning the handle.

The setting system shown in Figs. 5, 6 and 8 varies in several details from the main form, but the principle of operation is the same. Similar transmitters 2 and 35' are provided.

The repeater compass embodies a motor 60, the six field poles of which are wound with coils 61, which are operated to attract an armature 62, which turns upon the central pivot 62', driving, by means of a pinion, the gear wheel 63, which in turn operates the gear wheel 64, and drives any form of arc indicator, such as the pointer 65, which moves with the gear wheel 64 and coöperates with the stationary scale 65'; or, as is usual, the scale may move, coöperating with the stationary pointer. The whole may be covered, as by glass 66, and be located within the casing 66'. In Fig. 8 the stem of the gear 63 is indicated by 63'. A pinion on this stem meshes with the gear 64, the hollow stem 64' of which receives the central pin 64'', and serves to support the pointer 65 through the friction engagement at 65$^x$, seen at the upper surface of the flange of the hollow stem 64'. These friction surfaces are kept in engagement by the spring 67. A handle or equivalent device 67' is provided in any suitable locality, as at the lower end of the stem 64'', for operating the pointer at will or manually setting or adjusting. A magnet, preferably polarized, is indicated at 68, and when energized in the proper direction, as by a reversing switch 69 (Fig. 5), serves to elevate a pin 68', so that its top engages either one side or the other of a stop 65'' on the pointer 65. This works in an elongated slot 68'' (Fig. 6), so that its engagement upon either side of the projection 65'' of the pointer 65 will cause the same to exactly center with reference to the scale. If the scale is the moving element, the stop 65'' will, of course, be fastened thereto.

The double throw switch 51' performs the same function as in the other form of the invention. I also prefer to make as a part thereof a switch 69' which automatically reverses magnet 68 when the repeaters are thrown on the setting transmitters. In such event, reversing switch 69 is only used after the repeaters have been set to zero, in order to release the lock.

In accordance with the provisions of the patent statutes, I have herein described the principle of operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:—

1. In combination with a master instrument and a distant repeating indicator for repeating the movements of said instrument, two electrical transmitters, one driven by the movements of said instrument, and means for throwing the repeating system into connection with either one or the other of such transmitters.

2. In combination with a gyro-compass and a distant repeating dial or pointer for repeating the indications of the compass, two electrical transmitters, one driven by the movements of the gyro-compass and the other adapted to be actuated at will, and means for throwing the repeating system into connection with either one or the other of such transmitters.

3. In navigational apparatus, the combination with a master instrument, of a distant repeating device including a movable indicator, an electrical connection between the instrument and the device and electrical means for setting or adjusting the indicator to agree with the indications of the instrument including means for temporarily arresting said indicator at a predetermined point.

4. In a navigational apparatus, the combination with a direction indicating instrument of a number of repeating compasses electrically connected thereto, including means for normally maintaining said compasses in synchronism with said instrument and other means for setting or adjusting the several compasses when a compass falls out of synchronism.

5. In gyro navigation apparatus a dial or pointer and a distant repeating system for repeating the indications of such a dial or pointer, electrical connections between the compass and the repeating system and electrical means for manually setting or adjusting the dial or pointer of the repeaters to agree with the indication of the gyro-compass.

6. In combination with a gyro-compass an electric transmitter operated by the apparent movements thereof, a distant repeating dial or pointer for repeating the indications of the compass, comprising a step-by-step electric motor having its field magnet pole pieces arranged in pairs, the pole pieces of each pair being situated diametrically opposite and wound so as to be energized together, the transmitting device being arranged to energize the said pole pieces in single and double pairs alternately, substantially for the purpose specified.

7. In combination with a gyro-compass, an electric transmitter operated by the apparent movements thereof, a distant repeating dial or pointer for repeating the indications of the compass, and means for rotating said dial comprising a step-by-step electric motor having field coils, the motor being controlled by the transmitter, the arrangement being such that the motor performs twice as many steps to one full cycle of the transmitter as there are field coils upon the motor.

8. In combination with a gyro-compass, an electric transmitter operated by the apparent movements thereof, a distant repeating dial or pointer for repeating the indications of the compass, and means for rotating said dial comprising a step-by-step electric motor having pole pieces, the motor being controlled by the transmitter, the arrangement being such that the motor performs twice as many steps to one full cycle of the transmitter as there are pole pieces upon the motor.

9. In a repeater system, a master transmitter, a plurality of repeater motors, a common setting transmitter connected to said motors and an electric switch located between the motors and said transmitters adapted to disconnect the motors from the master transmitter and to connect them to said setting transmitter.

10. In a repeater system a transmitter driven by a master indicator, a repeater motor actuated from said transmitter, a setting transmitter and means for throwing said repeater motor into circuit with said setting transmitter.

11. In a repeater system a transmitter driven by a master indicator, a repeater motor actuated from said transmitter, a setting transmitter and means for throwing said repeater motor out of circuit with said first mentioned transmitter and into circuit with said setting transmitter.

12. In an indicating system, the combination with a master indicator and transmitter and a repeating indicator adapted to be actuated thereby, of a setting transmitter, a lock on said repeating indicator adapted to hold it in a predetermined position, when operative, and means for throwing said repeating indicator from the master transmitter circuit to the setting transmitter circuit and for rendering said lock operative.

13. In an indicating system, the combination with a master indicator and transmitter and a repeating indicator adapted to be actuated thereby, of a setting transmitter, an indicator connected to said setting transmitter, a lock on said repeating indicator adapted to hold it in a predetermined position, when operative, means for throwing said repeating indicator from the master transmitter circuit to the setting transmitter circuit and for rendering said lock operative, and independent means for rendering said lock inoperative.

14. In a repeater system, the combination with a repeater motor and indicator, reduction gearing between said motor and indicator, a normally inoperative electrical locking means for said motor adapted, when excited, to lock the motor in a predetermined position, a setting transmitter and indicator reduction gearing between said transmitter and indicator, a position indicating click for said transmitter and a manually operable switch in circuit with said locking means, whereby both the indicators and the motor and transmitter may be brought into the same phase relation.

15. In a repeater system, the combination with a repeater motor and indicator, reduction gearing between said motor and indicator, a normally inoperative electrical locking means for said motor adapted, when excited, to lock the motor in a predetermined position, a setting transmitter and indicator, a position indicating click for said transmitter, a manually operable switch in circuit with said locking means, and a second switch in said circuit adapted to be closed when said repeating indicator is in a predetermined position, whereby both the indicators and the motor and transmitter may be brought into the same phase relation.

16. In a repeater system, the combination with a sending instrument, of a repeating indicator, a motor connected to said indicator adapted to cause it to repeat at a distance the movements of said instrument, auxiliary control means, means for substituting said auxiliary control means for said sending instrument, and a lock associated with said indicator, adapted to lock it when it has reached a predetermined position.

17. In a repeating system, the combination with a sending instrument and a transmitter connected thereto, of a repeating indicator comprising a repeater motor adapted to be actuated from said transmitter, an indicator controlled by said motor, a normally inoperative lock for said indicator, adapted when excited to lock the indicator in a predetermined position, means located adjacent said sending instrument for operating said lock, an auxiliary transmitter and means for substituting said last named transmitter for the first named one.

18. A system for repeating the position of an object at a distance comprising a repeating device remotely located with reference to said object, means connecting said object and said repeating device, auxiliary control means located adjacent said object and means for breaking the connection between said object and repeating device and for connecting said repeating device to said auxiliary control means.

19. A system for repeating the position of an object at a distance comprising a repeating device remotely located with reference to said object, means for actuating said repeating device on movement of said object and means including an element actuatable at a position adjacent said object for causing actuation of said repeating device without disturbing the position of said object.

In testimony whereof I have signed my named to this specification, this eighteenth day of August, 1915.

ELMER A. SPERRY.